3,150,834
METHOD OF COMMINUTING THERMOPLASTIC MATERIALS
Carroll F. Doyle, Ellicott City, and Henry P. Zerhusen, Baltimore, Md., assignors to W. R. Grace & Co., New York, N.Y., a corporation of Connecticut
No Drawing. Filed Feb. 19, 1962, Ser. No. 174,262
4 Claims. (Cl. 241—15)

This invention relates to very finely divided thermoplastic synthetic resins, and to a method for preparing the same. More particularly, this invention relates to a method for reducing the ultimate particle size of particulate thermoplastic synthetic resins to less than about 50 microns.

Numerous thermoplastic synthetic resins having a wide range of physical properties are presently available. Representative examples of such thermoplastic synthetic resins include polyamides (e.g., the various nylons); polyesters; homopolymers and copolymers of polymerizable monoethylenically unsaturated vinylidene compounds characterized by a single group of the formula $CH_2=C<$ including (for example) acrylic and methacrylic acid, acrylic and methacrylic esters, acrylonitrile, methaacrylonitrile, styrene, vinyl naphthalene, substituted and unsubstituted vinyl pyridines, vinyl halides such as vinyl chloride and vinyl fluoride or the like, vinylidene halides such as vinylidene chloride or the like, vinyl esters such as vinyl acetate, vinyl formate, vinyl proprionate, vinyl stearate or the like, vinyl ethers and vinyl ketones such as methyl vinyl ether, phenyl vinyl ether, ethyl vinyl thioether, methyl vinyl ketone, phenyl vinyl ketone or the like; various polyacetals such as polyoxymethylene and the like; cellulose acetate; cellulose nitrate; ethyl cellulose; the various polymers of alpha-monoolefins such as ethylene, propylene, 1-butene, 1-pentene, 1-hexene, 5-methyl-1-pentene, 4-methyl-1-pentene, 3-methyl-1-pentene and other like alpha-monoolefins containing from 2 to 8 carbon atoms, copolymers of two or more of such alpha-monoolefins, and copolymers of one such alpha-monoolefin with a minor amount (not more than about 15 percent by weight) of any one of the polymerizable monoethylenically unsaturated compounds previously mentioned.

In order to use such thermoplastic synthetic resins in certain applications, e.g. flame spraying, solution casting, dip molding, compression molding, etc.; or as thickeners, fillers, extenders, thermal insulation, etc.; it is often highly desirable and sometimes required that the resin be in very finely divided form. Ordinarily all of these materials are supplied to the consumers in the form of pellets or granules. In some few instances, the resins are available as a so-called "powder" which upon inspection is found to be of sandy texture and to contain the resin in particles ranging upwards from about 200 to 500 microns in size.

Attempts to grind any of the particulate forms of the above-mentioned thermoplastic resins have been generally unsuccessful, since as grinding progresses the material becomes soft and begins to stick to various parts of the grinding mill, thus necessitating numerous shut downs for cleaning operations. Furthermore, the ground particles begin to stick to each other and agglomerate, thus defeating the purpose of the grinding operation.

Numerous methods for preparing finely divided thermoplastic synthetic resins have been proposed by prior art workers. Examples of such proposals include (1) dissolving in a heated solvent for the resin followed by cooling the solution to precipitate "powdered" resin or (2) grinding the resin after it is refrigerated or modified to make it brittle. All of the prior methods require very expensive and/or involved procedures for accomplishing the desired size reduction.

It is an object of this invention to provide finely divided thermoplastic synthetic resins of very fine particle size. Another object is to provide a process for comminuting particulate thermoplastic synthetic resins to a very fine particle size. A further object of this invention is to provide a simple, inexpensive and rapid process for reducing the ultimate particle size of particulate thermoplastic synthetic resins to less than about 50 microns. Still other objects of the invention will become apparent to those skilled in the art after consideration of the following more detailed disclosure.

It has been found that the foregoing objectives can be accomplished by feeding particulate thermoplastic synthetic resin to be comminuted, as a slurry or suspension in a non-solvating liquid which is inert to the resin, between a pair of closely spaced grinding surfaces; rotating the grinding surfaces with respect to each other thereby shearing the resin particles to very fine size; and separating the comminuted thermoplastic resin particles from the inert liquid.

The particulate thermoplastic resin to be comminuted in accordance with this invention should preferably have a particle size less than about 3 to 6 mesh so as to permit passage between the grinding surfaces. In other words the largest dimension of the thermoplastic resin particles should be less than about ¼-inch and most preferably is less than about ⅛-inch. Most, if not all, of the thermoplastic synthetic resins are sold in the form of pellets, granules, etc. having sizes meeting the above requirements.

Any suitable non-solvating inert liquid can be used in the process of this invention. A particularly useful liquid, because of its ready availability, low cost, and wide scope of utility, is water. Other inert liquids include alcohols, ketones (e.g., acetone), various aliphatic and cycloaliphatic hydrocarbons, mineral oils, esters, and an infinity variety of other liquids. As will be obvious to one skilled in the art, some of the liquids mentioned are inert with regard to some thermoplastic resins and highly solvating with regard to others. Thus the choice of suitable liquid for any particular type of thermoplastic may be more limited than for another type. In any case, however, those skilled in the art will be able to readily determine a suitable liquid. As previously noted, water is suitable for use with any thermoplastic resin and hence is greatly preferred. The inert liquid is used in amounts sufficient to constitute at least about 70 percent by weight of the feed stream. In other words, the slurry or suspension of particulate thermoplastic resin must have a solids content no greater than about 30 percent by weight.

Suitable apparatus for practicing the process of this invention is known in the art, generally being referred to as a colloid mill or an attrition mill. In each of these types of devices there is a pair of grinding surfaces which rotate with respect to each other. One surface may be stationary while the other revolves, or both surfaces may be revolved in opposite directions. The surfaces may be smooth or roughened as desired, but preferably are rough in order to achieve the greatest degree of comminution in the shortest period of time. In any case, the grinding surfaces are positioned in a closely-spaced relationship (usually about .005 to about .020 inch) with respect to each other. As the large sized thermoplastic resin particles are carried or forced between the closely-spaced grinding surfaces they are sheared and subdivided into very fine particle size. It has been observed that most particulate thermoplastic resins can be comminuted to particle sizes less than about 50 microns in one pass through the apparatus used in the practice of this invention. When a very fine product is desired or when oversize particles (greater than about 50 microns) occur in the effluent from the mill, the effluent can be recycled until the desired degree of fineness is obtained.

Temperature and/or pressure is not critical in the process of this invention. Obviously, the process should not be performed at temperatures or pressures which would volatilize the inert liquid or permit the liquid to dissolve or alter the properties of the particulate resin to be comminuted. Since the process gives good to excellent results at atmospheric temperature and pressure such conditions are preferred.

The process of this invention can be used to comminute any of the thermoplastic synthetic resins mentioned previously herein as well as other like thermoplastic materials not specifically mentioned. The thermoplastic materials can be comminuted to an ultimate particle size less than 50 microns in a very short period of time by use of this process. The very finely divided thermoplastic resin produced constitutes a very useful article of commerce.

In the process of this invention the thermoplastic synthetic resin particles do not become soft or molten as a result of comminution. Consequently, there is not sticking and buildup on any part of the apparatus used and no agglomeration of the resin particles. It is not necessary to cool the comminuting apparatus in any way. The mechanical action of the apparatus causes little or no observable heating of the inert liquid used, and the liquid can be recycled for further use virtually indefinitely.

The invention is illustrated by the following non-limiting specific examples.

Example I

A sample of commercial Nylon 66, a high molecular weight poly (hexamethyleneadipamide) was preliminarily ground to reduce the greater dimension of the particles to less than about ⅛-inch. The coarse ground resin was then fed together with a stream of ordinary tap water into a Morehouse colloid mill (Model M–Ms). The size reduction elements of this mill consists of two adjustably spaced grinding stones, one in fixed position and one rotatable. The stones were adjusted to give the closest possible spacing therebetween by starting the mill, bringing the stones together and then backing off until there was no detectable contact. The effluent from the mill, consisting of water and finely divided nylon was filtered through a 140 mesh (U.S. Standard) screen. The filtrate was collected in a storage vessel and recycled to the mill feed inlet as needed. The ground nylon particles collected on the screen were examined under a microscope and found to range from about 2 to about 45 microns in size, with an average particle size of slightly greater than 40 microns.

Example II

The same equipment and procedure described in Example I was used to produce finely divided polyethylene. The polyethylene resin used had a density of about 0.96 and a melt index of about 0.7 and was initially in the form of pellets. A portion of the ground resin collected on the 140 mesh screen was recycled through the mill a second time. Particle size of resin passed through the mill only one time was determined by microscopic examination and found to range from about 2 to about 100 microns. Polyethylene resin that had been subjected to two passes through the mill was also examined and found to have an average particle size just under 25 microns, with a particle size range of from about 1 to about 25 microns.

Example III

Pellets of a commercial low-density (0.91 to 0.92) polyethylene having a melt index of less than about 1.0, were ground to an average particle size of about 40 microns in a single pass through the mill described in Example I, together with a stream of water. The ground resin particles had a size range of from about 1 to about 42 microns.

Example IV

The equipment and procedure described in Example I was used to grind a sample of a polyacetal resin. This thermoplastic resin is a poly (oxymethylene) polymer having a number average molecular weight of about 70,000 and a weight average molecular weight of about 140,000.

A large portion of the ground resin contained in the colloid mill effluent passed through the 140-mesh screen. This material when microscopically examined is found to have a particle size ranging from less than 1 micron to about 5 microns, with an average particle size of about 2 microns. The particles of ground resin retained on the screen had an average particle size of about 200 microns.

Example V

By proceeding in the manner described in the previous examples, an experimental high molecular weight poly (oxymethylene) resin suspended in acetone was comminuted to fiber-like particles having a particle size as low as about 1 micron.

Example VI

A sample of isotactic polystyrene that had been cross-linked with acrylonitrile by irradiation was comminuted to particles all having a major dimension less than about 50 microns by using the procedure described in the previous examples.

What is claimed is:

1. In a process for comminuting particulate thermoplastic resins wherein material to be comminuted is passed in a liquid stream between closely spaced rotating grinding surfaces, the improvement which comprises passing said particulate resin through said grinding surfaces in a stream of water said water being the sole dispersant in an amount not greater than about 3 parts of said resin per 7 parts by weight of said water, and separating said comminuted resin particles from said water.

2. A process according to claim 1 wherein the thermoplastic resin is nylon.

3. A process according to claim 1 wherein the thermoplastic resin is polyethylene.

4. A process according to claim 1 wherein the thermoplastic resin is polyoxymethylene.

References Cited in the file of this patent
UNITED STATES PATENTS

| | | |
|---|---|---|
| 1,555,805 | Kroeber | Sept. 29, 1925 |
| 2,342,387 | Catlin | Feb. 22, 1944 |
| 2,578,523 | Llewellyn | Dec. 11, 1951 |
| 2,686,738 | Teeters | Aug. 17, 1954 |
| 3,006,561 | Eberl et al. | Oct. 31, 1961 |